(12) United States Patent
Guindulain Busto

(10) Patent No.: US 9,380,909 B2
(45) Date of Patent: Jul. 5, 2016

(54) WATER DISPENSER FOR INSTANT-BEVERAGE VENDING MACHINES AND INSTANT-BEVERAGE VENDING MACHINE INCLUDING SAID DISPENSER

(71) Applicant: Jofemar, S.A., Peralta (Navarra) (ES)

(72) Inventor: Felix Guindulain Busto, Navarra (ES)

(73) Assignee: JOFEMAR, S.A., Peralta (Navarra) (ES)

( * ) Notice: Subject to any disclaimer, the term of this patent is extended or adjusted under 35 U.S.C. 154(b) by 306 days.

(21) Appl. No.: 14/360,145

(22) PCT Filed: Nov. 21, 2012

(86) PCT No.: PCT/ES2012/070809
§ 371 (c)(1),
(2) Date: May 22, 2014

(87) PCT Pub. No.: WO2013/076335
PCT Pub. Date: May 30, 2013

(65) Prior Publication Data
US 2014/0291352 A1 Oct. 2, 2014

(30) Foreign Application Priority Data

Nov. 22, 2011 (ES) .................................. 201131878

(51) Int. Cl.
*B67D 7/74* (2010.01)
*A47J 31/46* (2006.01)

(52) U.S. Cl.
CPC ........................................ *A47J 31/46* (2013.01)

(58) Field of Classification Search
CPC ............ A47J 31/46; B67D 2001/0094; B67D 1/0081; B67D 1/0014; B67D 1/0003
USPC .......... 222/129.1–129.4, 146.1, 146.2, 146.6; 99/281–317; 137/607, 625, 137/625.11–625.14
See application file for complete search history.

(56) References Cited

U.S. PATENT DOCUMENTS

| | | | | |
|---|---|---|---|---|
| 3,949,645 A * | 4/1976 | Masclet | ................... | B64C 25/26 137/625.64 |
| 4,026,325 A * | 5/1977 | Loveless | ................ | F16K 11/044 137/625.26 |
| 4,187,884 A * | 2/1980 | Loveless | ................ | F16K 11/065 137/625.66 |
| 4,491,154 A * | 1/1985 | Peters | ................. | F16K 11/0716 137/625.26 |
| 4,823,842 A * | 4/1989 | Toliusis | ............... | F15B 13/0405 137/625.26 |
| 4,863,068 A * | 9/1989 | Smith | .................... | B67D 1/005 137/607 |
| 4,887,740 A * | 12/1989 | Smith | ................... | B67D 1/0084 137/625.17 |
| 6,286,549 B1 * | 9/2001 | Carse | ................... | B67D 1/0051 137/607 |
| 6,661,968 B2 | 12/2003 | Beaulieu | | |
| 2010/0077927 A1 | 4/2010 | Buettiker | | |

FOREIGN PATENT DOCUMENTS

EP 2062512 A1 5/2009
WO 2010043952 A1 4/2010

* cited by examiner

*Primary Examiner* — Lien Ngo
(74) *Attorney, Agent, or Firm* — Hayes Soloway, P.C.

(57) ABSTRACT

Water distributor comprising: a first hot water inlet pipe with two outlets; a second pipe with first inlets, each of them being connected to the corresponding first outlet by means of a third pipe, said second pipe further comprising several second outlets; a rod having at least one narrowing and sliding within said second pipe by action of some actuating means; and water tightness means situated on both sides of each of the second outlets. The positioning of the narrowing of the rod with respect of the water tightness means of each outlet determines whether water will be allowed to flow through said outlet or not. Advantage: guaranteeing that the opening and closure of the different water outlets correspond with the selection made by the user.

15 Claims, 13 Drawing Sheets

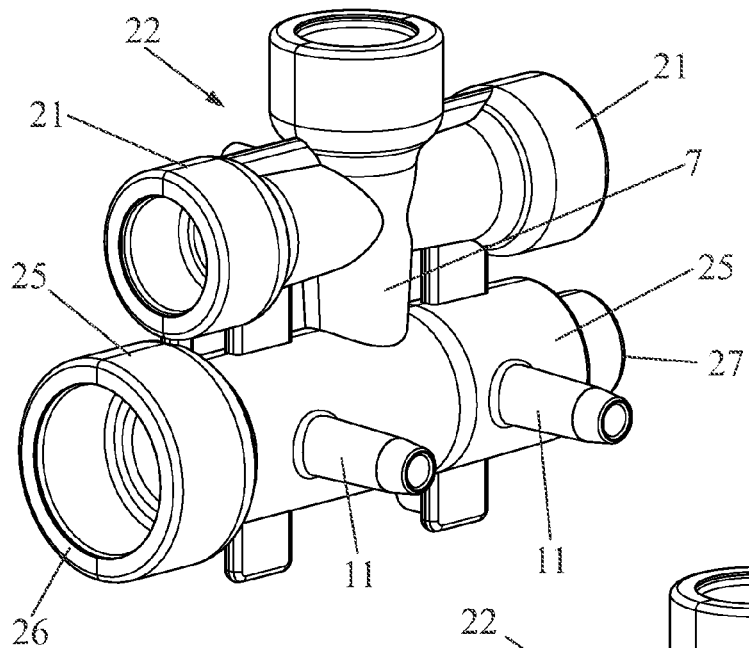
FIG. 6
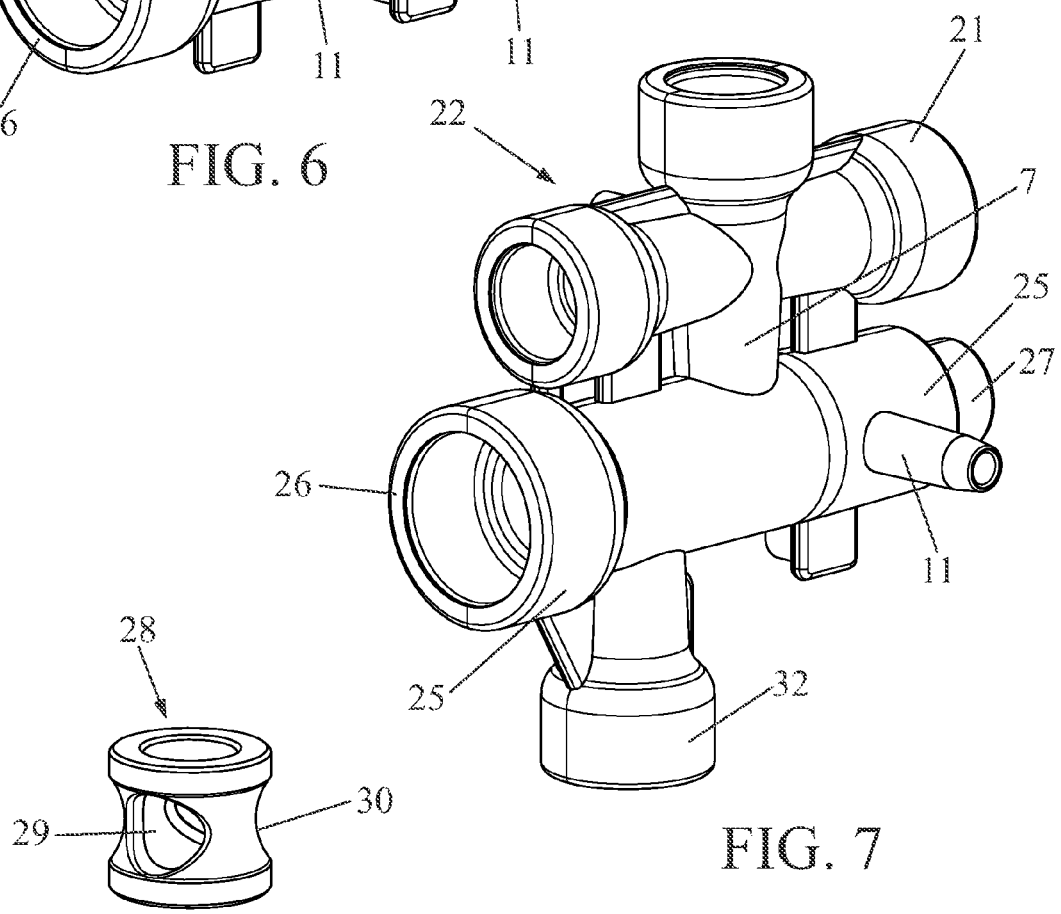
FIG. 7
FIG. 8

WATER DISPENSER FOR INSTANT-BEVERAGE VENDING MACHINES AND INSTANT-BEVERAGE VENDING MACHINE INCLUDING SAID DISPENSER

FIELD OF THE INVENTION

The present invention may be included within the technical field of instant beverage vending machines. Precisely, the field of the invention relates to a water dispenser for one of such machines, as well as one of such machines that incorporates said dispenser.

BACKGROUND OF THE INVENTION

A dispenser for an instant beverage vending machine is designed to receive the water entering said dispenser coming from the boiler and provide the exit for said water towards an outlet channel, which is determined depending on the beverage selected by the user, for example: coffee, coffee with milk, chamomile infusions, tea, chocolate, etc.

According to what is currently known, in order to cause the water to exit through the adequate channel, dispensers use one or several electrovalves assembled over the body of the boiler, connected to said boiler or as a satellite to it, as is described in Spanish patent request P200931021, by JOFEMAR.

In said request P200931021, the opening and closing of said electrovalves is made through the excitation of magnetic induction coils that overcome the force of a spring which is in charge of guaranteeing the closing of the electrovalves when said electrovalves are not excited and of holding the pressure generated inside the boiler due to the water heating. The electrovalves of these systems may have two or three lines but, in any of the two cases, they have several functionality problems, due to the lime built up as a consequence of heating the water, as well as coffee grounds reaching said electrovalves, occasionally preventing the normal operation of said valves due to the placement of said particles among the closing surfaces of the electrovalves, causing the system not to be watertight, contrary to how it should be.

In other occasions, these particles are deposited in the opposite side of the closing area, preventing the movement of the mobile induction core and thus the opening of said electrovalve in situations when it should be open.

The patent document US 2010077927 discloses a water dispenser for instant beverages vending machines comprising:
a first hot water inlet pipe towards the dispenser;
a second pipe provided with a first inlet and also provided with several second outlets to allow water to exit said second pipe towards two beverage selection channels;
a rod arranged inside the second pipe and which is longitudinally movable along said second pipe by action of actuation means, said rod being provided with at least one first narrowing arranged in an intermediate area;
water tightness means, arranged on both sides of a second outlet to prevent the circulation of water between the rod and the inner surface of the second pipe, wherein the actuation means are adapted to provide the stopping force to the rod, in at least one first position and a second position, where the first position of the narrowing of the rod is located entirely between the water tightness means corresponding to two consecutive outlets, and in the second position, at least a part of the narrowing is housed between some water tightness means and their corresponding second outlet, so that the water may circulate between the rod and the water tightness means, to access the corresponding second outlet and leave the second pipe towards a channel corresponding to a selected drink.

In summary, there is uncertainty in these systems, in the sense that there are no guarantees as to whether the opening or closure condition of the electrovalves corresponds with what is theoretically assumed depending on the selection made.

DESCRIPTION OF THE INVENTION

The present invention solves the aforementioned disadvantages through, according to a first aspect, a water dispenser for instant beverage vending machines, which features the characteristics described below and, according to a second aspect, an instant beverage vending machine incorporating the aforementioned dispenser.

The dispenser of the invention comprises a first inlet pipe designed to transport water towards the dispenser, where, according to a first embodiment, said first pipe will be blocked at a first final end, which is opposite to a second end where the water enters the dispenser. Said first pipe is provided, in a plurality of intermediate points, with a plurality of corresponding first outlets designed to allow water to exit said first pipe.

The dispenser additionally comprises a second pipe, blocked in a third final end and provided with first inlets, each one being connected to its respective first outlet from the first pipe through a third pipe. Inside the second pipe, there is a rod arranged, which is longitudinally movable along the second pipe by the action of some actuation means. The rod is provided with at least one first narrowing arranged in an intermediate area.

The second pipe is provided with a plurality of second outlets that enable the water to exit said second pipe towards a plurality of corresponding beverage selection channels. On both sides of each of the second outlets there are watertightness means to prevent circulation of water between the rod and the inner surface of the second pipe. Preferably, the watertightness means comprise an O-ring arranged on each side of each of the second outlets.

The actuation means are adapted to provide the stopping to the rod, during its movement along the second pipe, in at least a first position and several second positions. In the first positions, the first narrowing of the rod is located entirely between the watertightness means corresponding to two consecutive second outlets, which does not allow water accessing the second outlets because this is prevented by the watertightness means. In the second positions, at least one part of the first narrowing is housed between one of the watertightness means and its corresponding second outlet, so that the water may circulate between the rod and the watertightness means, accessing the corresponding second outlet and exiting the second pipe towards the corresponding channel.

The above embodiment presents an optimal application for non-bean instant beverage vending machines, i.e. of the soluble or infusion type, in which the entry water does not have to be subsequently pressurized, so that it is not necessary to release the pressure later.

However, the dispenser of the invention may be easily adapted for its placement in an instant beverage vending machine that, besides soluble beverages, it also serves bean beverages and that, therefore, is provided with a bean unit and a fourth pipe, connected to one of the second outlets, for the water to exit from the dispenser to the bean unit.

Preferably, in this embodiment for bean machines, the rod comprises two narrowings. When coffee is selected, the first narrowing remains in the second position adapted for the water to exit the second pipe through the second outlet connected to the coffee unit. Said second outlet is preferably the one placed closer to the fourth end opposite to the third blocked end of the second pipe. Subsequently, it is necessary to release the pressure remaining in the coffee unit; therefore, the shaft moves to take a second position which allows water to exit towards the fourth end.

Even more preferably, in the aforementioned case, a second narrowing is located in such a way that, when the pressure from the coffee unit is released, said second narrowing takes a second position which leaves one of the second outlets from the second pipe open. This arrangement allows, if the water is pushed through the first pipe, said water to exit the second pipe through the aforementioned second outlet, while at the same time releasing pressure.

In another preferred embodiment, the dispenser of the invention is adapted to be part of an instant beverage vending machine in which the water exiting through some of the channels should not be in contact with the section of the second pipe designed for other channels. An example wherein said supply is particularly advantageous illustrates the case in which the machine dispenses both hot and cold soluble drinks, so that the water designed for hot water should not access the sections designed for cold drinks.

For that, the first pipe comprises a plug placed between two first consecutive outlets; it also incorporates a fifth water inlet pipe to the dispenser, arranged, with respect to the first pipe, on the opposite side of the aforementioned plug.

Compatible with any of the embodiments described above, the dispenser incorporates some detection means to detect the position of the rod. Preferably, the detection means comprise an optical detector adapted to recognize the indentations provided on the rod, one of which acts as a positioning reference with the remaining used to determine the position of the rod depending on the reference indentation. The presence of the detection means is a particularly advantageous characteristic of the invention, since it allows guaranteeing that the real opening or closing position of the second outlets is in accordance with the beverage selection made by the user.

DESCRIPTION OF THE DRAWINGS

In order to complement the description that is being made, and to help to a better understanding of the characteristics of the invention, according to a preferred embodiment thereof, a set of drawings is attached as an integrating part of this description where, with an illustrative, non-limiting character, the following has been represented:

FIGS. 1 and 2 are applicable to coffee bean machines in reference to the determination of the water exiting from one of the second outlets.

FIG. 6.—Shows a perspective view of a connection element with a double T shape comprised in the first pipe.

FIG. 7.—Shows a perspective view of a variant of FIG. 6, incorporating an outlet to the coffee unit.

FIG. 8.—Shows a perspective view of a second bushing of those arranged between two consecutive second outlets.

PREFERRED EMBODIMENT OF THE INVENTION

Figure 1:
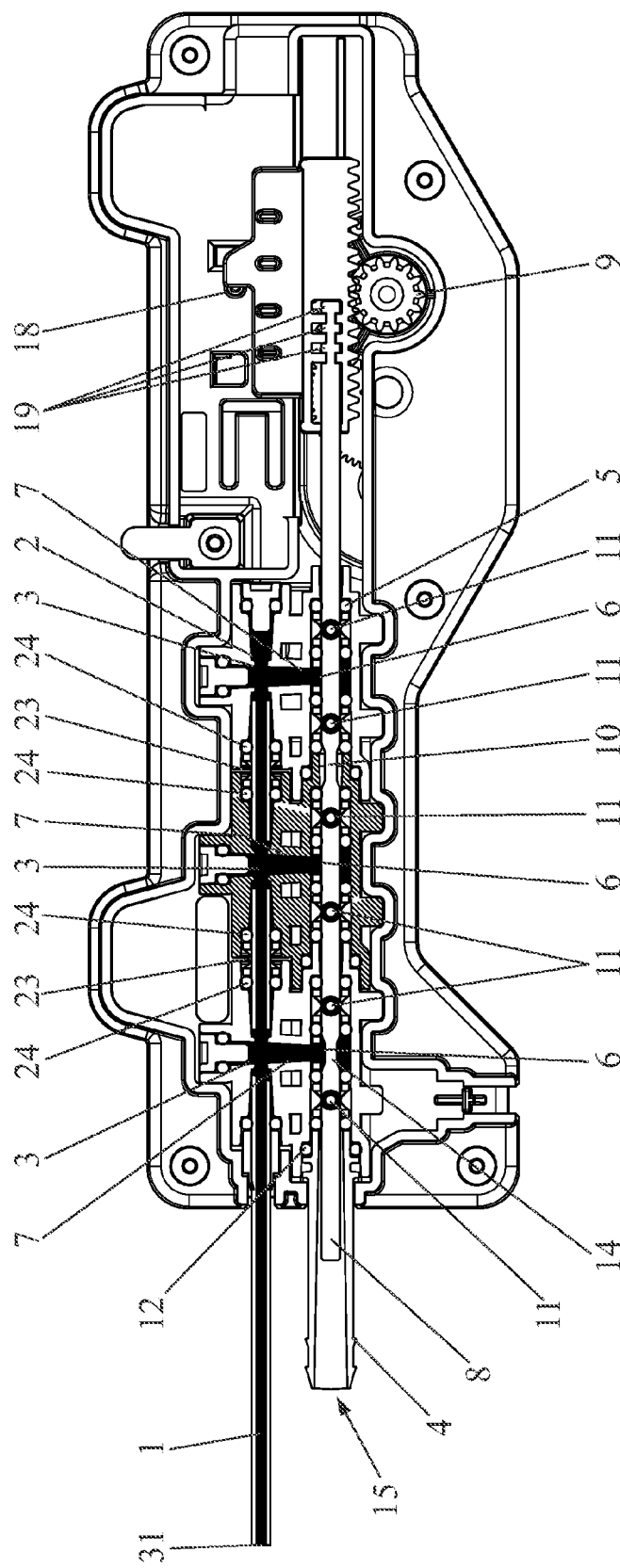
FIG. 1.—Shows a schematic view of the dispenser of the invention in the case of a soluble beverage machine, for a first position of the rod in which there is no water exiting toward any second outlet of the second pipe.
Figure 2A:
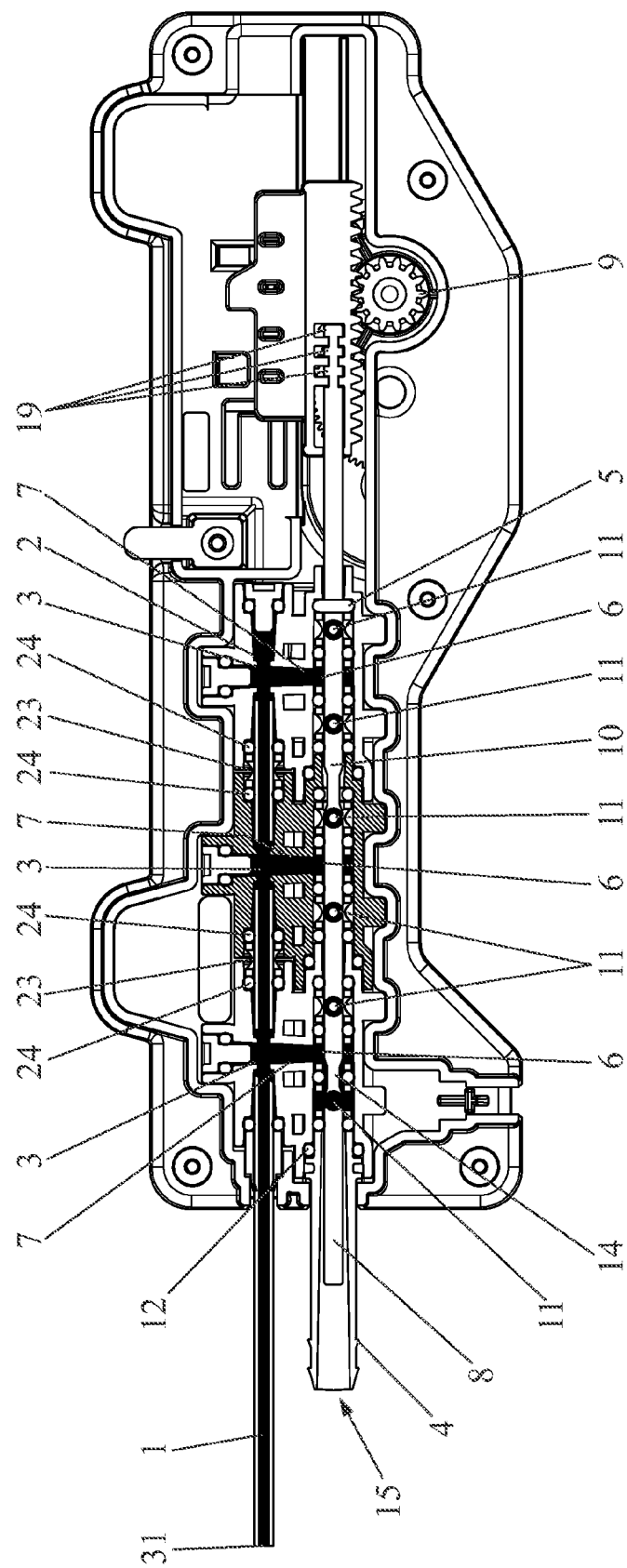
FIGS. 2a to 2f.—Show a plurality of schematic views of the dispenser of FIG. 1, for corresponding second positions of the rod where there is water exiting through each of the six different second outlets.
Figure 2B:
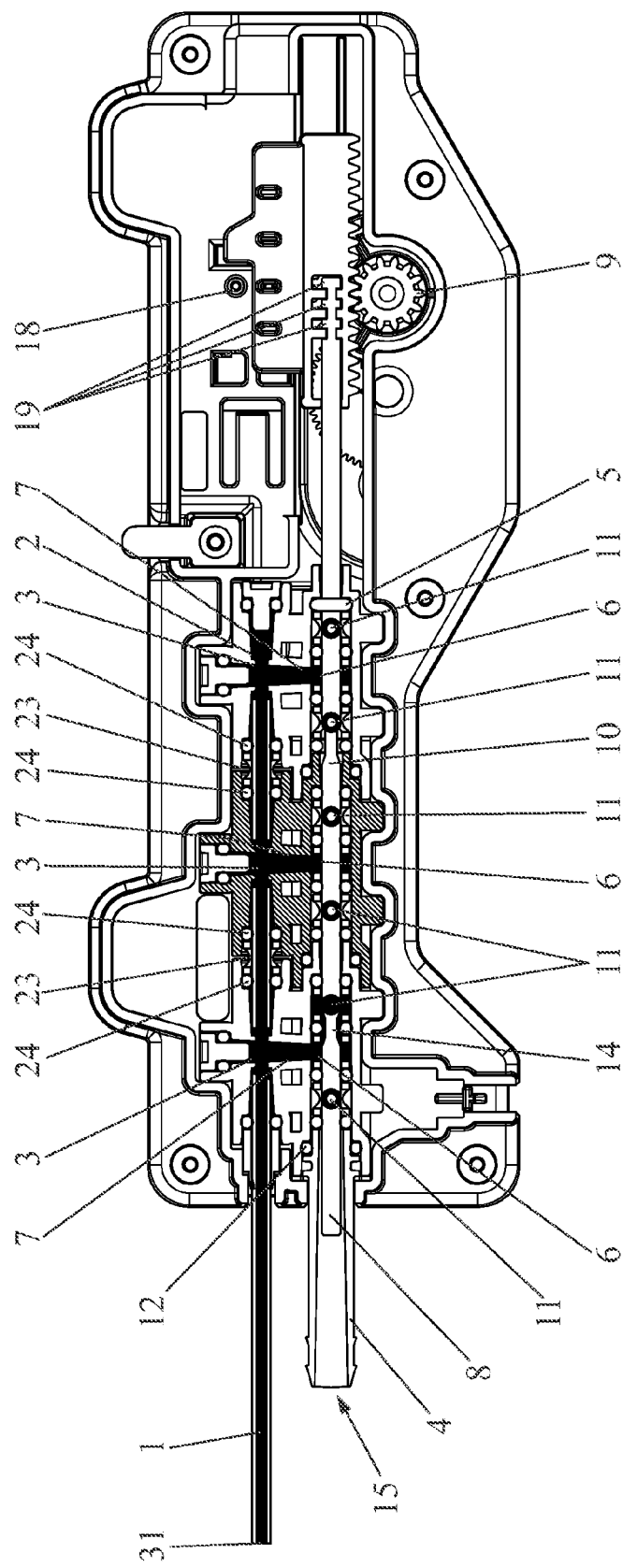
Figure 2C:
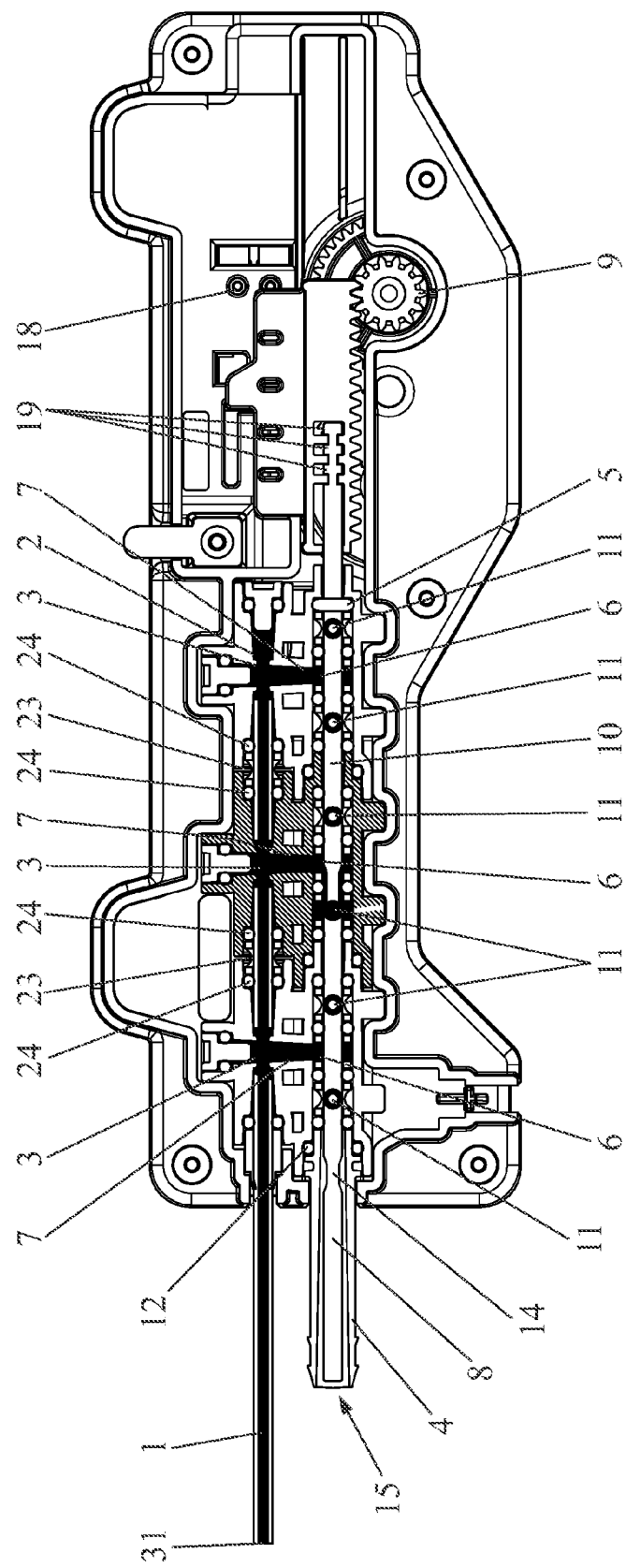
Figure 2D:
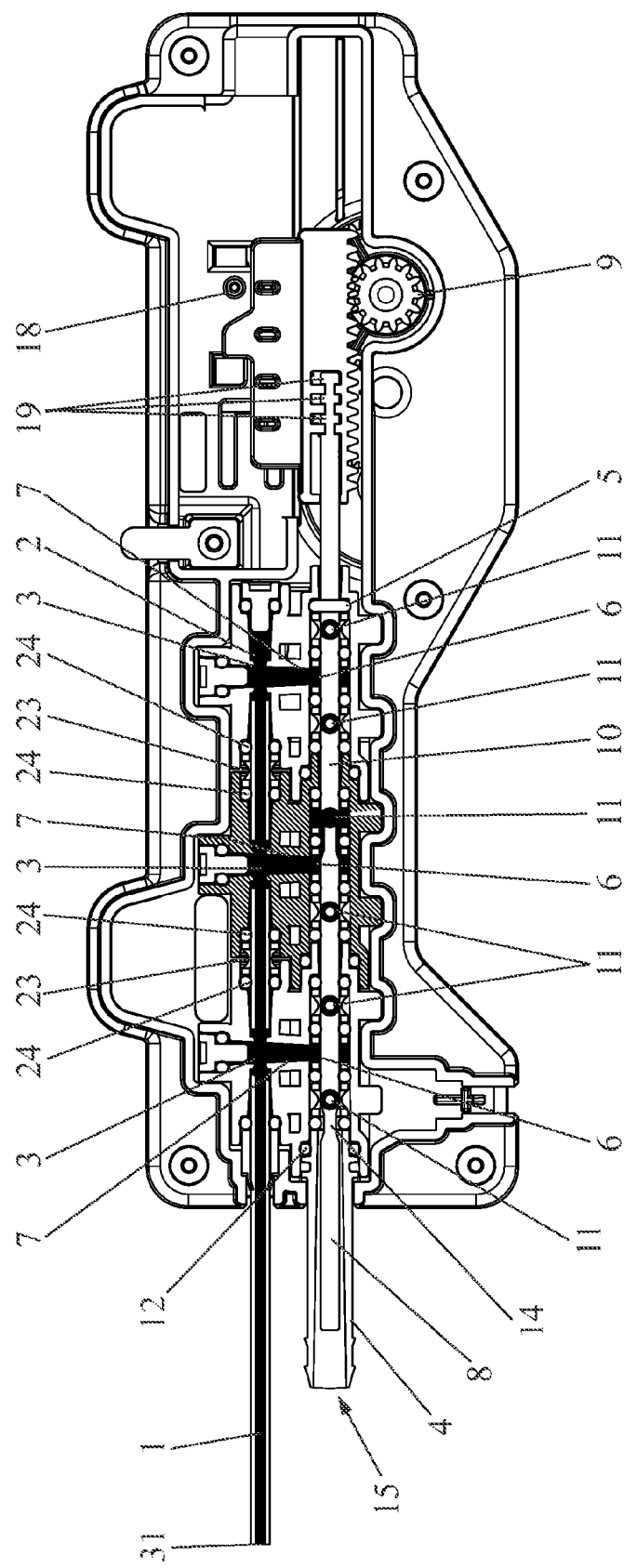
Figure 2E:
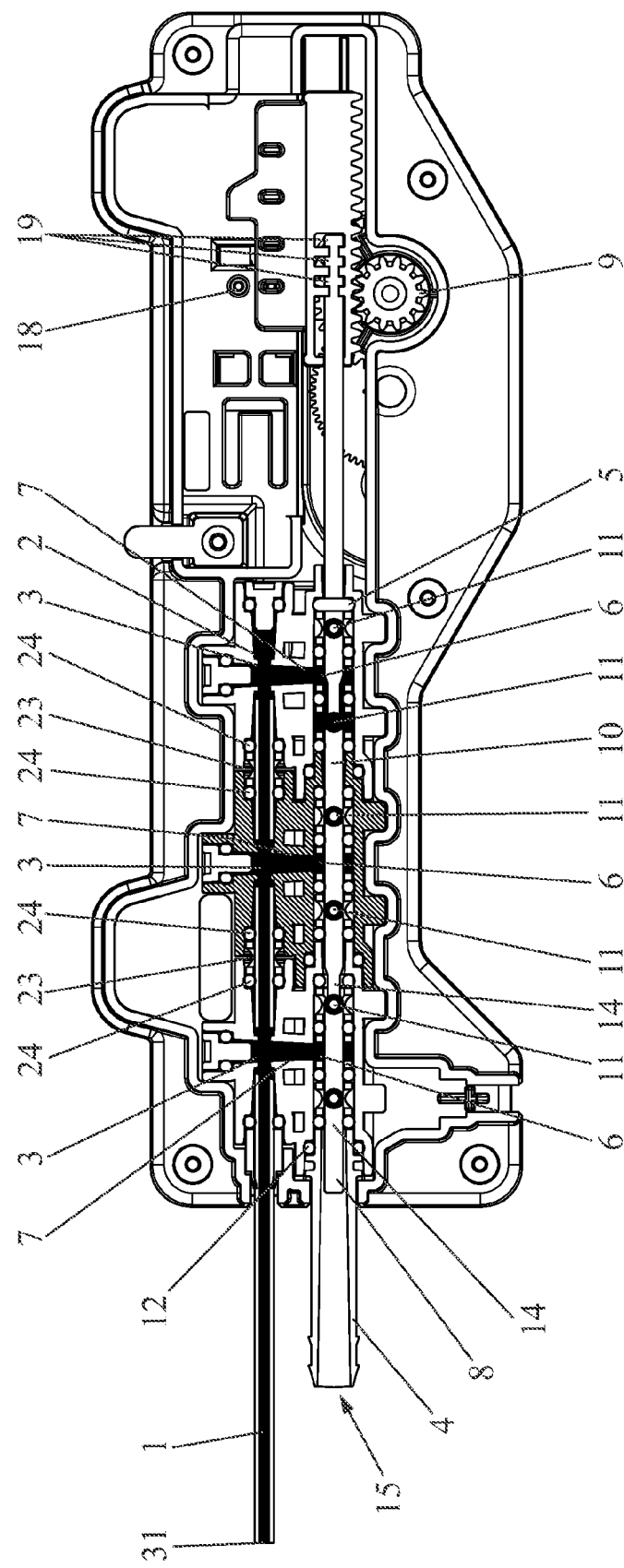
Figure 2F:
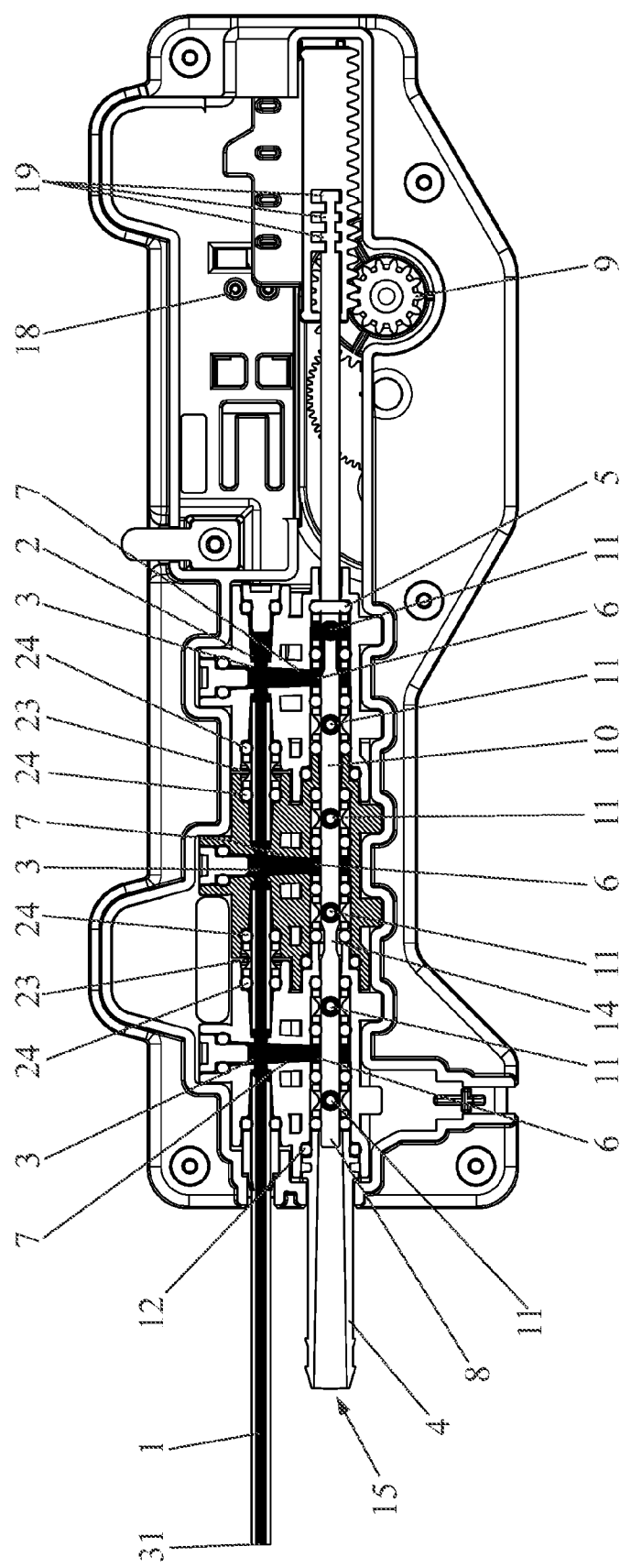

Shown below is a detailed description with the help from the attached FIGS. 1 through 9b of three preferred embodiments of the present invention.

1.—Soluble Instant Beverage Vending Machine

As shown in any of FIGS. 1 to 5, the water dispenser for a soluble beverage vending machine according to the first preferred embodiment comprises a first inlet pipe (1) designed to transport water towards the dispenser. Said first pipe (1) is blocked in an first final end (2) opposite to a second end (31) of the water inlet, with said first pipe (1) also being provided, in a plurality of intermediate points, with a plurality of corresponding first outlets (3) designed to allow the water to exit said first pipe (1).

The dispenser additionally comprises a second pipe (4), blocked in a third final end (5) and provided with first inlets (6), each of which is connected with its corresponding first outlet (3) of the first pipe (1) through a third pipe (7). In order to reduce costs (see FIGS. 6 and 7), the first pipe (1) is preferably made up of several first sections of plastic tube with a reduced diameter connected consecutively through first wings (21) of the connection elements (22) with a double T shape made of molded plastic. Each of the preferably three connection elements (22) (to provide six types of soluble beverages), is connected by the end of its first wings (21) with their corresponding first sections of plastic tube by way of first bushings (23) and watertightness rings (24) pressed between the first bushings (23) and the first section or the corresponding end of the first wing (21).

The second pipe (4) is provided with several second outlets (11) to allow the water to exit said second pipe (4) towards both channels (not shown) for the selection of beverage.

Due to the same cost reduction purpose as previously described, (again, see FIGS. 6 and 7), the second pipe (4) is preferably made up of the second wings (25) of the connection elements (22) with a double T shape, where the core of said connection elements (22) forms the third pipe (7). Said second wings (25) incorporate, as attachments, as an integrating part by way of molding or as it may be constructively more suitable, the second outlets (11) towards the different beverage channels. Likewise, said second wings (25) are consecutively watertightness linked as it may be more constructively more suitable. Preferably, the ends of the second wings (25) have a compatible male-female configuration, so that one female end (26) of the second wing (25) may be linked to a male end (27) of the second wing (25) of the contiguous connection element (22) with the help of, for example, watertightness (24) O-rings.

Inside the second pipe (4) there is a rod (8) that is movable longitudinally along said second pipe (4) by action of some actuation means (9). The rod (8) is provided with at least one first narrowing (10) arranged in an intermediate area. At each of the sides of each of the second outlets (11) there is an O-ring (12) to prevent the circulation of water between the rod (8) and the inner surface of the second pipe (4), totaling two O-rings (12) for each second outlet (11).

As will be seen further below in a more clear way, there may be several narrowings (10, 14) in the rod (8), preferably two, thus reducing the length of the rod (8) which is necessary to provide all of the second positions for stopping said rod (8), so that it is not always the same narrowing (10, 14) that determines the exit of water through any of the second outlets (11).

Since each connection element (22) enables the installation of two second outlets (11), there are four O-rings (12) for each connection element (22). Said O-rings (12) are separated and fixed through three second bushings (28) arranged consecutively, for each of the connection elements (22). As shown in FIG. 8, both the first bushings (23) and the second bushings (28) are preferably made of plastic and preferably comprise a through bore (29) transversal to its longitudinal direction and a perimeter channeling (30), with both the bore (29) and the channeling (30) fulfilling the function of facilitating water towards the second pipe (4).

The actuation means (9) are adapted to provide the stopping force to the rod (8), in its movement along the second pipe (4), in at least one first position and several second positions. In the first position, which is shown in FIG. 1, the first narrowing (10) of the rod (8) is located entirely within the watertightness means (12) corresponding to two consecutive second outlets (11), which does not allow the water to access the second outlets (11), since this is prevented by the watertightness means (12).

In the second positions, shown in FIGS. 2a to 2f, at least one part of the first narrowing (10) is housed between one of the watertight means (12) and its corresponding second outlet (11), so that the water may circulate between the rod (8) and the watertightness means (12), accessing the corresponding second outlet (11) and exiting the second pipe (4) towards the corresponding channel. It may be seen in each of the FIGS. 2a to 2f that there are two first narrowings (10, 14), properly arranged to determine the water exiting through each of the provided six second outlets (11). The presence of two narrowings (10, 14) prevents the length of the rod (8) from being unnecessarily long.

2.—Soluble and Bean Hot Beverage Vending Machine

Figure 3:
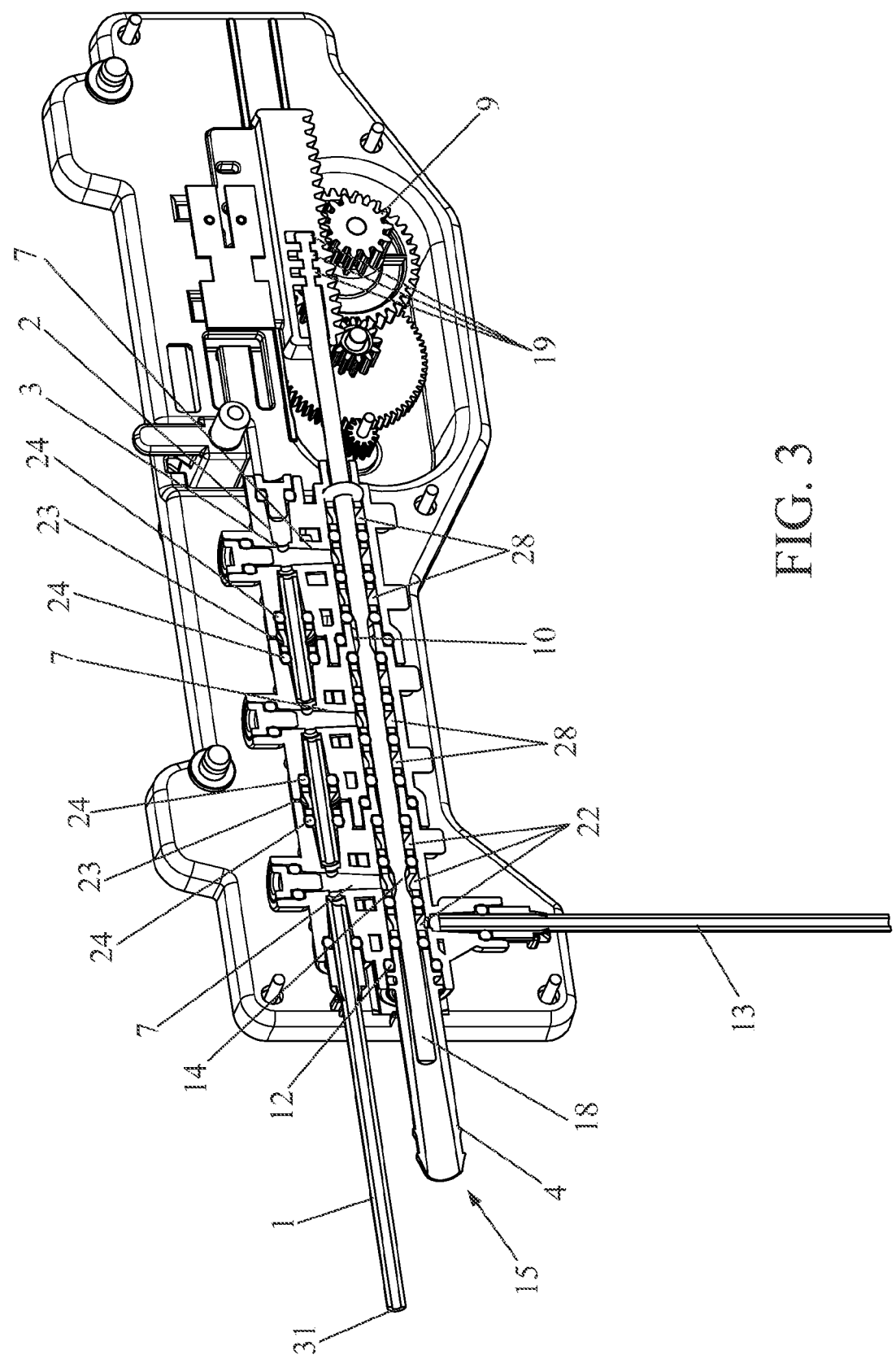
FIG. 3.—Shows a longitudinal sectional view of the dispenser for a soluble and a coffee bean machine. This view is also applicable to the soluble-only machine in everything that does not refer to the exit of water towards the coffee unit.
Figure 4:
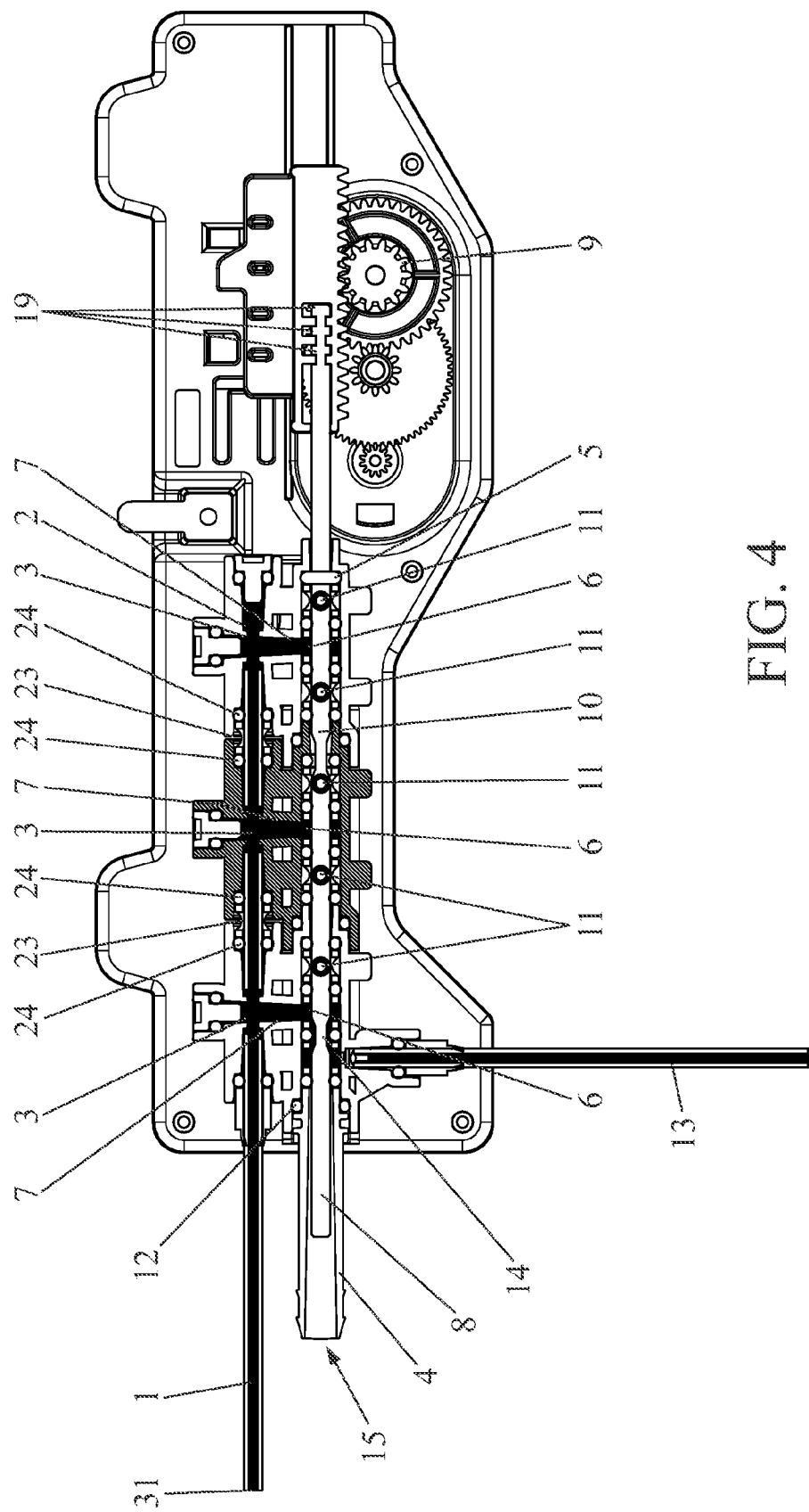
FIG. 4.—Shows a schematic view of the dispenser of the invention for a soluble and a coffee bean beverage machine, for the case of water exiting towards the coffee unit.
Figure 5:
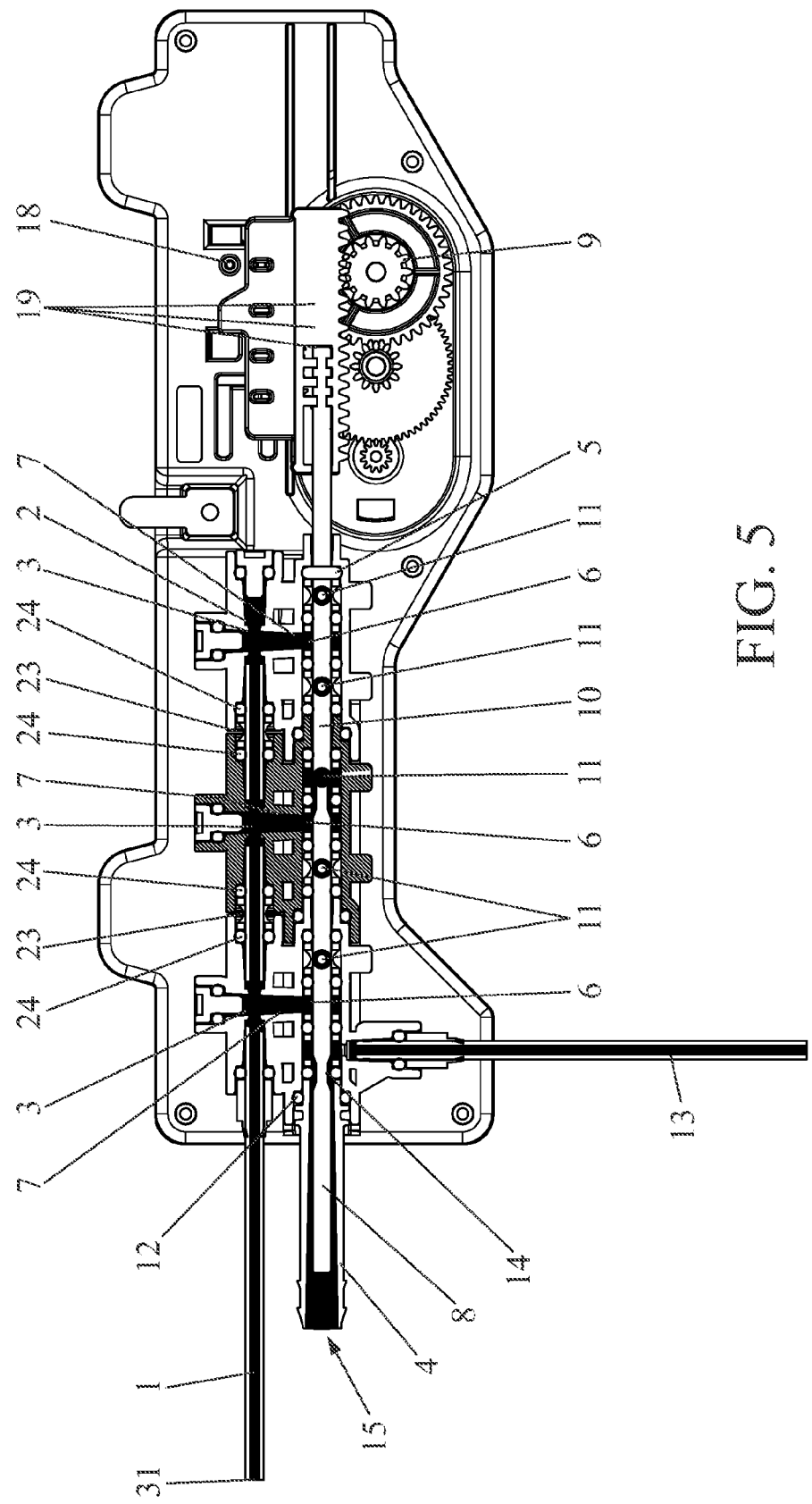
FIG. 5.—Shows a schematic view of the dispenser of the invention, for the case of pressure being released from the coffee unit and with a simultaneous water exit through a second outlet.

As shown in FIGS. 3, 4 and 5, an instant beverage vending machine of the bean type and soluble type is additionally provided with, as opposed to the one that only dispenses soluble type beverages, a bean unit (not represented) as well as a fourth pipe (13), connected to one of the second outlets (11), for the water to exit from the dispenser towards an intake (not shown) designed for the bean unit.

In this embodiment, the rod (8) comprises a second narrowing (14). When coffee is selected, as may be seen in FIG. 4, the first narrowing (10) remains in the second position adapted for the water to exit the second pipe (4) through the second outlet (11) connected to the bean unit, which is the second outlet (11) arranged closest to a fourth end (15), opposite to the third end (5), of the second pipe (4). Subsequently, as may be seen in FIG. 5, it becomes necessary to release the remaining pressure from the bean unit, so the rod (8) is moved to take a second position that allows the exit of water towards the fourth end (15) of the second pipe (4), as well as preventing the exit of water through the intake towards the bean unit.

Even more preferably, in the aforementioned case, the second narrowing (14) is arranged in a way that when the pressure is released from the bean unit, said second narrowing (14), takes a second position that leaves one of the second outlets (11) of the second pipe (4) open. This arrangement allows, if the water is pushed through the first pipe (1), said water to exit the second pipe (4) through the aforementioned second outlet (11) while the pressure is released.

3.—Vending Machine for Soluble and Bean Beverages, Both Hot and Cold

In this preferred embodiment, the dispenser is adapted to be part of a vending machine for soluble beverages, both hot and cold (e.g. coffee frappe), so that the hot water shall not access areas designed for cold beverages.

This is important because the majority of manufacturers use the same first (1) and second (4) pipes for both cold and hot beverages. As a consequence, in order to obtain a cold beverage after having selected a hot beverage (or vice versa), the machine must use a large amount of extra water to cool (or heat) the first pipe (1) and second pipe (4). Said water goes to a waste container (not represented), with limited capacity, risking that the machine may become out of service due to this container becoming full, much sooner than running out of supplies, with the addition of the disadvantages derived from water waste and, in its case, energy waste in order to heat said water.

Figure 9A:
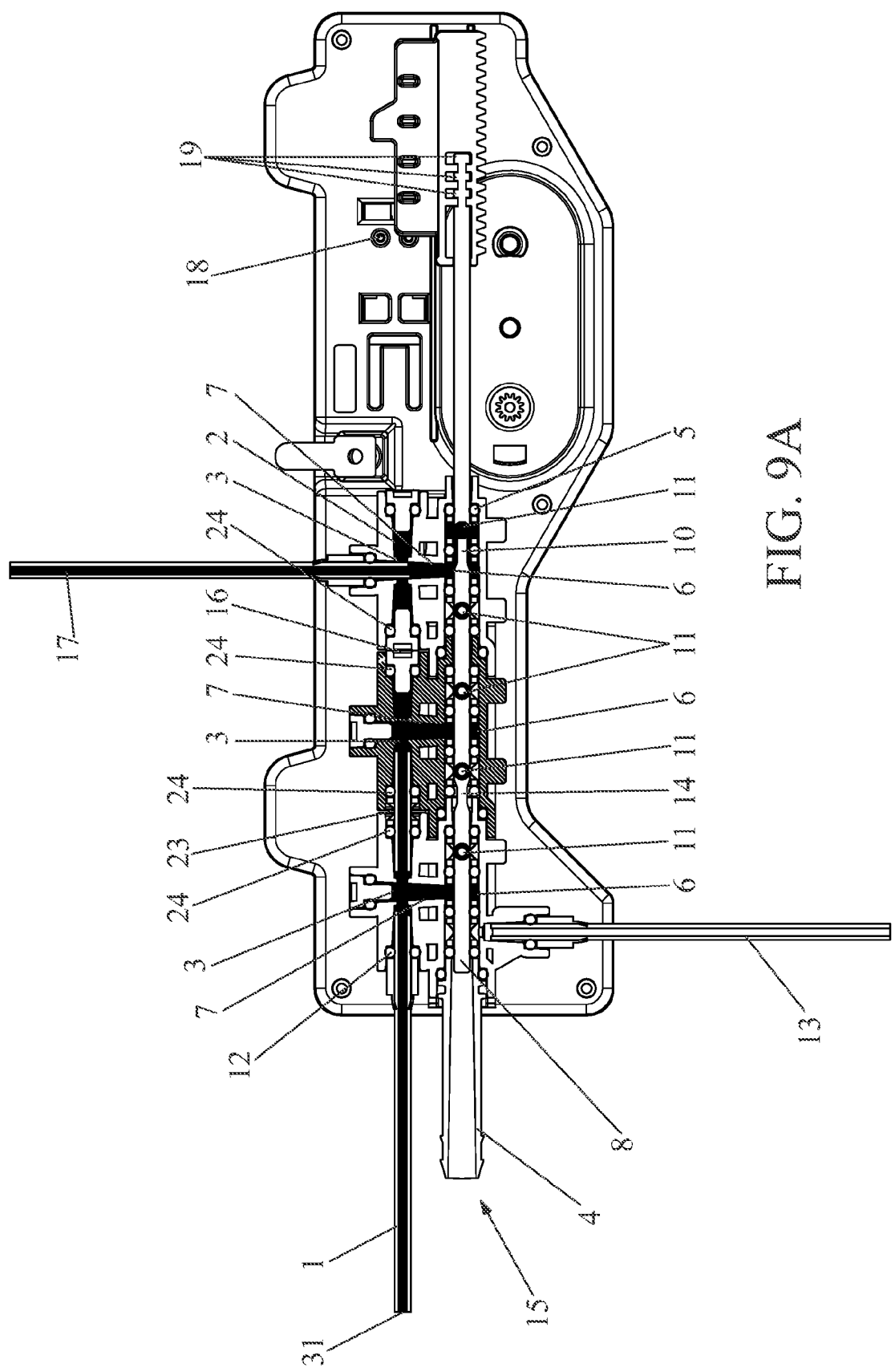
FIGS. 9a and 9b—Show schematic views of the dispenser for both hot and cold beverage machines, for second positions of the first rod where there is cold water exiting through different second outlets.
Figure 9B:
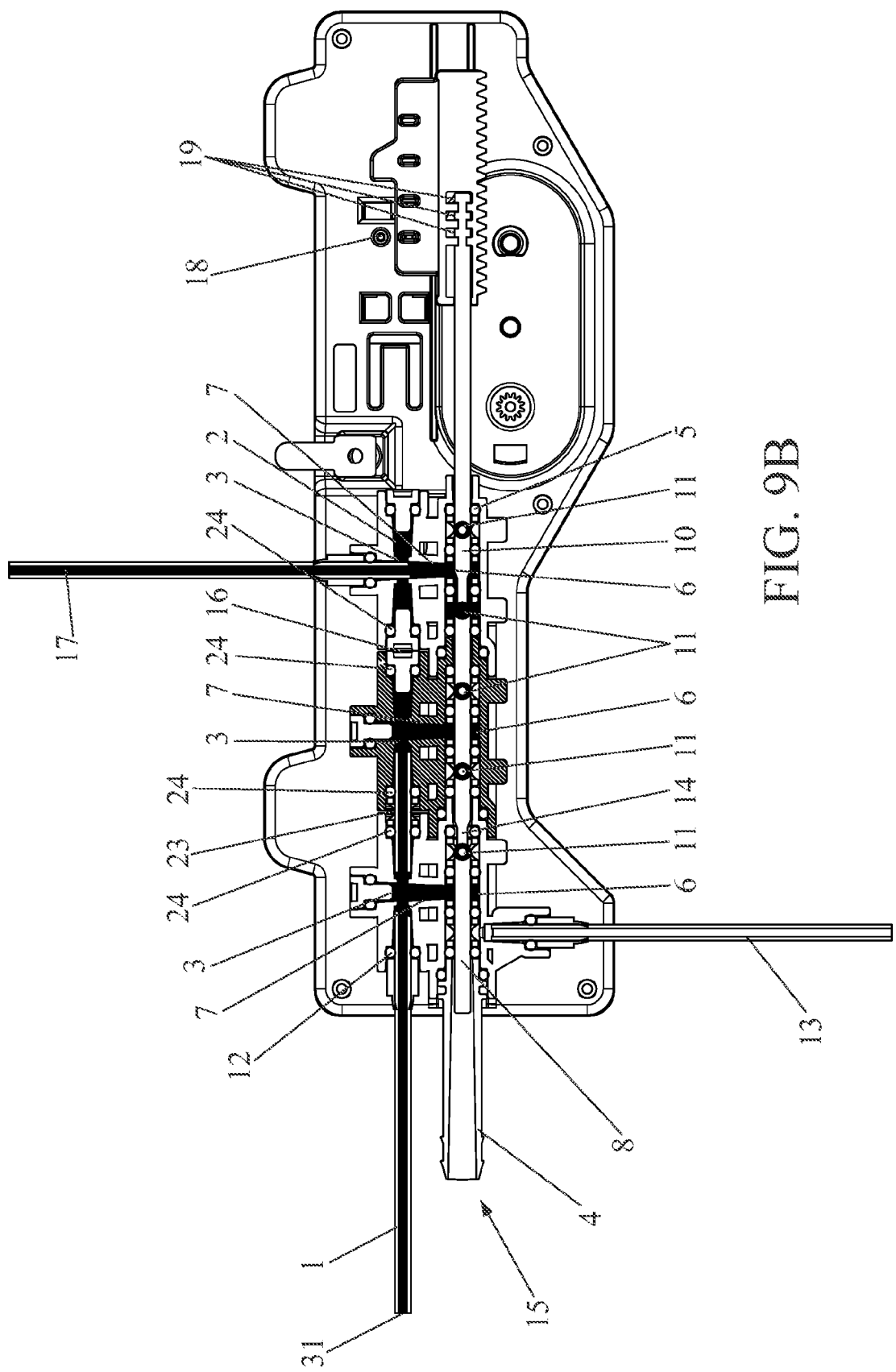

In order to avoid this disadvantage, the first pipe (1) comprises a plug (16) arranged between the two consecutive first outlets (3), as well as incorporating a fifth cold water inlet pipe (17) to the dispenser, which is arranged, with respect to the first pipe (1), on the side opposite of the aforementioned plug (16). This is shown in FIGS. 9a and 9b.

According to the present embodiment, the fifth pipe (17) is connected to the first end (2) of the first pipe (1), which is opposite to the hot water inlet.

Compatible with any of the embodiments previously described, the dispenser incorporates some detection means (18, 19) to detect the position of the rod (8). Preferably, the detection means (18, 19) comprise an optical detector (18) adapted to recognize some indentations (19) coupled with the rod (8), one of which acts as a positioning reference with the remaining ones used to determine the position of the rod (8) depending on the reference indentation.

Provided through this invention is a water dispenser for an instant beverage vending machine that guarantees that the exit of water is done effectively and exclusively through the second outlet (11) corresponding to the selection made by the user, since the necessary watertightness needed in the second pipe (4) for the appropriate selection of the second outlet (11) is made without the need of active elements (such as springs) whose properties wear over time and with use.

On the other hand, the use of the dispenser according to the invention implies savings in costs, both due to the use of passive plumbing elements (with no energy use such as tubes, gaskets, joints) cheaper than the electrovalves used in the state of the art, and the use of molded pieces, of which cost of manufacturing, and therefore acquisition, is very low.

Likewise, the use of elements made of materials with low density and conductivity, such as plastics (molded or not), largely reduced the heat exchange with the atmosphere, which favors maintaining the temperature in the pipes, which allows the temperature of the beverages not to substantially depend on the time that the machine may have been inactive.

Also noteworthy of the invention is its modular nature, so that, depending on the number of first outlets (3) arranged in the first pipe (1) with its corresponding connection elements (22), it is possible to use in both soluble-only beverage machines an also bean machines, since the releasing of pressure from the bean unit is enabled.

Finally, it is worth mentioning that the movement of the rod (8) determines whether the second outlets (11) are open or closed, so that the closure is axial and not frontal, and thus, if a lime or coffee particle goes into a second outlet (11), it will be longitudinally moved along the second pipe (4) and will not prevent closing or opening said second outlet (11).

The invention claimed is:

1. A water dispenser for instant beverage vending machines, the water dispenser comprising:
   a first hot water inlet pipe towards the dispenser, which is provided in several intermediate points, with a plurality of first outlets located at corresponding intermediate points thereof designed to allow water to exit said first pipe;
   a second pipe provided with a plurality of first inlets each of which being connected with one corresponding first outlet of the plurality of first outlets through a third pipe and the second pipe also provided with a plurality of second outlets to allow the water to exit said second pipe towards a plurality of corresponding beverage selection channels;
   a rod arranged inside the second pipe and which is longitudinally movable along said second pipe by action of some actuation means, said rod being provided with at least one first narrowing arranged in an intermediate area;
   watertightness means arranged on both sides of at least one of the second outlets to prevent the circulation of water between the rod and an inner surface of the second pipe;
   wherein the actuation means are adapted to provide the stopping force to the rod, in at least one first position and at least one second positions,
   where the first position of the narrowing of the rod is located entirely between the watertightness means corresponding to two consecutive second outlets,
   and in the second positions, at least a part of the narrowing is housed between some watertightness means and the corresponding second outlet so that the water may circulate between the rod and the watertightness means, to access the corresponding second outlet and leave the second pipe towards a channel corresponding to a selected drink;
   wherein the water tightness means are arranged on both sides of each second outlets; and
   wherein the actuation means are adapted to provide the stopping force to the rod in a plurality of the second positions.

2. The water dispenser of claim 1, wherein the first pipe comprises:
   a plurality of first sections of plastic tube; and
   a plurality of plastic double T-shaped connection elements having:
      a core; and
      first wings, starting from opposite sides of the core, for consecutively connecting the first sections to each other.

3. The water dispenser of claim 2, additionally comprising:
   first bushings; and
   watertightness rings pressed between the first bushings and the first section or a corresponding end of the first wing; thereby connecting each of the connection elements at the end of its first wings to their corresponding first sections of plastic tube.

4. The water dispenser of claim 2, wherein the connection elements further comprise second wings starting from opposite sides of the core,
   wherein the second wings are consecutively watertight linked so as to form the second pipe;
   wherein the second wings incorporate the second outlets, and
   wherein the core of the connection elements forms each third pipe.

5. The water dispenser of claim 4, wherein the second wings comprise ends having a compatible male-female configuration, so as to allow one female end of a second wing to be linked to one male end of a second wing of the contiguous connection element, the water dispenser further comprising watertightness elements for connecting the male-female ends of the second wings to each other.

6. The water dispenser of claim 1, wherein the watertightness means comprise an O-ring arranged on both sides of each of the second outlets.

7. The water dispenser of claim 6, wherein the O-rings are separated by means of three second bushings consecutively arranged, for each of the connection elements.

8. The water dispenser of claim 7, wherein the second bushings comprise:
   a through bore transversal to a longitudinal direction of the second bushings; and
   a perimetral groove,
   thereby facilitating water passing along the second pipe.

9. The water dispenser of claim 1, wherein the rod comprises at least two narrowings.

10. The water dispenser of claim 1, wherein the first pipe has a blocked first final end and a non blocked second final end.

11. The water dispenser of claim 9, additionally comprising a fourth pipe, connected to the second outlet, which is closest to a non-blocked second final end of the second pipe, wherein the fourth pipe is connectable to a bean unit of a "soluble and bean"—type beverage vending machine, as well as a first narrowing and a second narrowing are separated so that when the rod is in a second position in which the first narrowing allows the exit of water towards the non-blocked second final end of the second pipe to release pressure from the bean unit, the second narrowing takes a position that allows the exit of hot water through another of the second outlets.

12. The water dispenser of claim 1, additionally comprising:
   a plug arranged between two consecutive first outlets of the first pipe, and
   a fifth water inlet pipe, connected to the first final end of the first pipe, wherein said fifth pipe is arranged, with respect to the first pipe, on the opposite side of the aforementioned plug, to guarantee that water access to any of the second outlets may only be reached either from the second end of the first pipe or from the fifth pipe.

13. The water dispenser of claim 1, characterized in that it additionally incorporates a detection means to determine the opening or closure of the second outlets depending on the position of the rod.

14. The water dispenser of claim 13, wherein the detection means comprises an optical detector adapted to recognize some indentations fixed to the rod, one of which acts as a positioning reference, the remaining ones being usable to determine the position of the rod depending on the reference indentation.

15. An instant beverage vending machine incorporating the water dispenser described in claim 1.

* * * * *